Nov. 13, 1962    H. F. MALONE    3,064,100
OVERLOAD CURRENT AND THERMAL PROTECTION DEVICE FOR MOTORS
Filed May 6, 1959
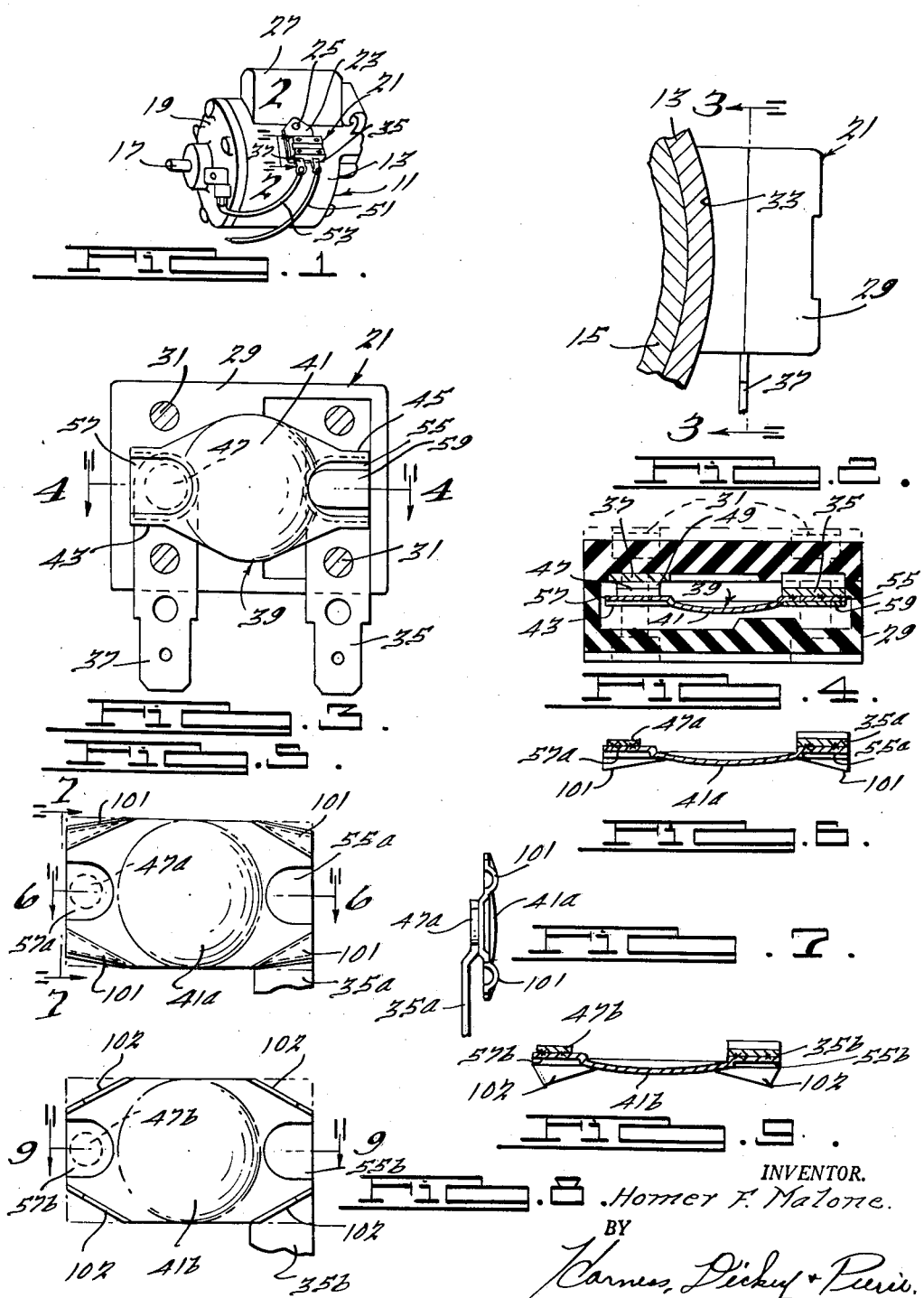
INVENTOR.
Homer F. Malone.
BY
Karnes, Dickey & Pierce
ATTORNEYS.

United States Patent Office

3,064,100
Patented Nov. 13, 1962

3,064,100
OVERLOAD CURRENT AND THERMAL PROTECTION DEVICE FOR MOTORS
Homer F. Malone, Jackson, Mich., assignor, by mesne assignments, to Mechanical Products, Inc., a corporation of Michigan
Filed May 6, 1959, Ser. No. 811,352
3 Claims. (Cl. 200—113)

This invention relates generally to circuit breakers and more particularly to an improved electrically and thermally sensitive circuit breaker construction having particular utility in protecting electric motors against excessive current and temperature conditions.

It has been found desirable in many instances to protect electric motors by shutting off the electric current flowing thereto when the motor temperature or current rises dangerously. In the past, many electric motor protective devices have been devised, but so far as is known, none of these devices have operated accurately, positively and sensitively to efficiently protect electric motors and motor windings both against current overload and against undesirable elevated temperatures which would tend to burn out the same and otherwise impair the efficiency or operation of the motor.

The circuit breaker of this invention has particular utility as a motor protector, although it will be appreciated that its utility is not limited to such use. Furthermore, the particular circuit breaker illustrated and described herein is of the automatic recycling type so that motor operation will resume when the motor temperature or current conditions return to proper or satisfactory levels. It will, however, be appreciated that the circuit breaker construction of this invention may be adapted for use as a manually resettable breaker or other type of overload protection device without departing from the scope of this invention.

It is, therefore, an object of this invention to provide an improved circuit breaker construction which can be mounted directly on an electric motor to shut off electric current to the motor when the motor temperature or current rises to a predetermined undesirable level.

It is a still futher object of this invention to provide a circuit breaker of the aforementioned type which will automatically recycle or restore motor operation when the motor temperature or current is lowered below the aforementioned undesirable level.

It is a still further object of this invention to provide a circuit breaker of the aforementioned type which can be inexpensively and accurately manufactured and calibrated so that it will operate to perform its desired function, and one which is small in size and weight, and durable in use and construction.

It is a still further object of this invention to provide a circuit breaker which incorporates a snap action thermostatic blade in which said blade is formed in an improved manner to provide improved results and maximum efficiency.

It is a still further object of this invention to provide a snap acting blade of the aforementioned type in which maximum deflection of one end of the blade, which carries a contact element, will be obtained when the blade is heated to a predetermined level at which a snap action occurs, and which can be variably controlled in its manufacture or production so that when it is incorporated in a circuit breaker, its contact element will remain in continuous high pressure engagement with a companion contact element until snap action occurs.

It is a still further object of this invention to provide an improved method of mounting a blade of the aforementioned type so that fatigue and failure of the blade will not occur.

It is a still further object of this invention to provide a circuit breaker snap action blade of the aforementioned type which has improved durability and may be more accurately and easily controlled and calibrated under production conditions than has been heretofore possible.

These and other objects of this invention will become apparent from the following detailed description, taken in conjunction with the accompanying drawing in which:

FIGURE 1 is a perspective view of an electric motor having a circuit breaker of this invention mounted thereon so as to protect the same against excessive current and temperature conditions;

FIG. 2 is an enlarged fragmentary view, partially in section and partially in elevation, taken along the line 2—2 of FIG. 1;

FIG. 3 is a view taken along the line 3—3 of FIG. 2;

FIG. 4 is a sectional view of the structure illustrated in FIG. 3, taken along the line 4—4 thereof;

FIG. 5 is a view similar to FIG. 3, showing a further embodiment of the invention;

FIG. 6 is a sectional view of the structure illustrated in FIG. 5, taken along the line 6—6 thereof;

FIG. 7 is an end elevational view of the structure illustrated in FIG. 5, taken along the line 7—7 thereof;

FIG. 8 is a view similar to FIG. 5, illustrating a still further embodiment of the invention; and FIG. 9 is a sectional view of the structure illustrated in FIG. 8, taken along the line 9—9 thereof.

Referring now to the drawing, it will be seen that an electric motor 11 is illustrated which may be of any suitable type such as, for example, a split phase start type, a single phase run type, a household appliance type or the like. The illustrated motor includes a housing or frame 13 which is generally cylindrical in shape and which surrounds a field structure 15 of any conventional type such as the type having an iron or laminated iron stator having field winding associated therewith in a conventional manner. In view of the fact that the motor construction itself does not form a part of this invention, details of the same have not been shown, but it will be appreciated that the motor, of course, has a suitable rotor structure supported within the motor and has a drive shaft 17 extending through one end wall 19 of the motor and adapted to drive some suitable device. The circuit breaker of this invention is illustrated generally at 21 and is mounted directly on the motor frame 13 by any suitable means. In the illustrated embodiment, the circuit breaker is supported directly on the frame 13 by means of a bracket 23 which is secured to the frame by a screw 25 which also secures the motor's capacitor 27 to the motor frame.

The circuit breaker 21 includes a two-piece plastic housing 29 of a generally rectangular shape with the two halves of the housing being secured together by suitable fastener means such as cap screws and nuts 31. The housing is made of electrical insulating material having good heat conductivity characteristics, and in the illustrated device is formed from a suitable thermoplastic. It will be noted that the housing 29 has a curved or arcuate face 33 to fit the cylindrical contour of the motor frame 13. The circuit breaker housing 29, therefore, engages the motor frame 13 and in the illustrated embodiment is in a direct heat conductive relationship with the field structure 15 so that heat from the motor field windings will be conducted directly from the field structure 15 to the motor frame 13 to the circuit breaker housing 29. While it is preferable, as will hereinafter appear, to mount the circuit breaker housing 29 in direct heat conductive relationship with the motor field structure 15, such mounting arrangement is not always possible or practical, but in any event, the circuit breaker should be mounted on a motor as close to the field structure as possible so that it can thermally sense the temperature of the field and respond thereto. In certain instances the circuit breaker may be mounted within the motor frame and directly on the field structure.

The circuit breaker illustrated in FIGS. 3 and 4 of the drawing includes a pair of terminals 35 and 37 which are fixedly supported in the housing 29 and have end portions extending exteriorly of the housing. A snap action thermostatic blade 39, illustrated as being of the bi-metallic type, is supported in the housing 29. The illustrated blade 39 includes a center portion having a deformed nondevelopable surface 41. The illustrated nondevelopable surface is a portion of a sphere which is adapted to change form abruptly when subjected to a predetermined elevated temperature. Integral ears or extensions 43 and 45 are provided on opposite ends of the blade 39, outwardly of the nondevelopable surface 41. The ear 45 is welded to the terminal 35 in a manner which will be hereinafter described in detail and the ear 43 has a contact element 47 welded thereto as will be hereinafter described in detail. The contact element 47 is movable into and out of engagement with a stationary contact 49 welded to the inner end of the terminal 37. The terminal 35 is adapted to be connected by a suitable electrical conductor or conduit 51 with a source of electrical power while the terminal 37 is connected by a suitable conduit or conductor 53 to the motor 11 so that current flow from the power source to the motor will be through terminal 35, bi-metallic blade 39, contacts 47 and 49 and terminal 37 through conductor 53 and to the motor. The wiring connections to the terminals 35 and 37 may, of course, be interchanged without affecting the operation of the circuit breaker. Current will flow through the circuit breaker if the contacts 47 and 49 are in pressure engagement with each other, but upon movement of the contact 47 out of engagement with the contact 49, current can no longer flow through the circuit breaker and thus current flow to the motor is interrupted.

The thermostatic blade 39 illustrated in FIGS. 3 and 4 is formed from a piece of bi-metallic sheet material which has a spherical nondevelopable surface 41 permanently deformed in the central portion thereof. Before or after such deformation in a die or similar tool, the opposite ends of the blade are embossed by suitable dies or tools to provide flat surfaces 55 and 57. The flat surfaces 55 and 57 extend inwardly from the outer ends of the ears 45 and 47, respectively, and terminate slightly inwardly of the outer periphery of the nondevelopable surface 41, adjacent each of the ears. The term "slightly inwardly of the periphery of the nondevelopable surface" is used to mean that the flat surfaces 55 and 57 do not extend inwardly more than one-quarter of the distance between the center of the nondevelopable surface 41 and the periphery thereof. The contact 47 is welded to flat surface 57 and terminal 35 is welded to one face of flat surface 55. The embossed flat surfaces 55 and 57, being defined by a wall-like edge or periphery which extends around the same, are thus stabilized and deflected out of the plane of the nondevelopable surface. It is thus possible to perform operations such as welding on surfaces such as 55 and 57 without the stresses resulting from such operations introducing undesirable alterations in the nondevelopable surface. There are other unique and desirable features associated with the embossments which will be described later.

An elongated plate 59 is welded to the opposite face of the flat surface 55 from the terminal 35 and the weld plate 59 is substantially coextensive in length with the flat surface 55, but is slightly narrower in width than the embossed flat surface. The blade ear 45 is thus embossed and welded to the terminal 35 and plate 59 so that one end of the blade is anchored in the housing 29 when the circuit breaker is assembled. The opposite end of the blade is thus free to deflect and move contact 47 into and out of engagement with contact 49 on terminal 37. The weld plate 59, therefore, reinforces the weldment at the anchored end of the blade 39 and prevents fatigue of the metal at the weldment and the area immediately surrounding the weldment. Since it is desirable to obtain maximum deflection beyond the zone of instability in each direction, it is important that the integral extensions be of less width than the nondevelopable surface, while still being wide enough to withstand the forces imparted to the blade. The inner end of the weld plate 59 thus acts to substantially define a line of action across the blade about which the blade will deflect by the greatest possible amount when it is heated to a predetermined temperature which will cause the nondevelopable surface to abruptly change form or snap, and reinforces the blade end so that it will not fatigue or fail even after it has ben actuated thousands of times. By so designing and constructing the thermostatic blade, the line of action (hereinafter referred to as "hinge line") is as far away from contact element 47 as is practical and an improved cantilever arrangement is provided so that increased and substantial deflection of the free or contact element end of the blade will occur when the blade snaps and deflects. This increased deflection is important because in prior blades, the deflection hinge line has been at substantially the center of the nondevelopable surface, thus allowing a lesser amount of deflection and smaller contact separation, and making the calibration and manufacturing of the device much more difficult and expensive.

The embossed flat surfaces 55 and 57 and the weld plate 59 play an important part in the manufacture and operation of the circuit breaker of this invention. The embossments provide flat weld surfaces on each end of the blade and act to confine heat stresses so as to reduce or eliminate any tendency of the blade to change its shape or become undesirably warped or deformed when the blade is spot welded to the terminal and plate and when the contact element is welded to the blade. Also, by varying the production blade forming tools, the angle at which each embossed flat surface 55 or 57 extends, relative to the adjacent blade ear, can be varied or selected to insure proper operation for circuit breakers having different operating characteristics.

There are an almost unlimited variety of response characteristics to be imparted to a thermally responsive blade, such as reaction time, current sensitivity, temperature of opening, temperature differential, contact pressure, millivolt drop, and others, so that when a circuit breaker is designed to have certain operational characteristics, the particular blade being employed must be properly selected and adjusted or calibrated to meet the variable characteristic requirements. In other words, the blade contact element 47 must properly engage terminal contact 49 and make and break contact at preselected current and heat values. This is accomplished with the structure of this invention by selecting or varying the angle at which at least one of the embossed flat surfaces extends. Thus, by experimentation prior to actual manufacture of a circuit breaker having certain operational characteristics, the angle of embossed flat surface 55 is varied and tests run to determine what angle provides consistent performance for the circuit breaker blade being used. By so selecting an angle for flat surface 55, proper engagement and disengagement of contacts 47 and 49 at the desired current and thermal levels can be obtained so that by thereafter manufacturing the blades with the flat surfaces extending at the determined angles, the circuit breaker will perform properly by maintaining a firm contact pressure up to the point where the stresses necessary to the reversal of contour occur, and by maintaining an open circuit condition until a re-establishment of the previous closed circuit condition occurs by snap action.

When a circuit breaker having the properly selected and calibrated blade therein is mounted on an operating electric motor as illustrated and described, the blade will be heated by current flowing therethrough and by heat conducted and/or radiated from the motor field structure. When the blade is heated to a predetermined level, it will snap open and interrupt current flow to the motor. Upon cooling, the blade will snap back to its normal position and close the contacts 47 and 49 and permit current flow again to the motor. By mounting the circuit breaker in direct heat conductive relationship with the motor field structure or in closed heat radiation relationship therewith, the blade can sense and respond to overheating of the motor. Under certain circumstances, such overheating may occur so as to cause the circuit breaker to open, even though high current overload does not occur. Also, on short circuiting or high current overload, the circuit breaker will open, even though the motor field structure has not had a chance to overheat and conduct or radiate any substantial amount of heat to the circuit breaker. However, under most circumstances, the heat conducted and/or radiated to the circuit breaker blade, combined with the heat caused by overload current flowing through the circuit breaker blade will coact to cause the blade to snap to its open position. Such an arrangement will thus protect a motor in a more positive and better manner than has been heretofore possible.

In the embodiments of the invention illustrated in FIGS. 5 to 9, still further thermostatic blade constructions are illustrated. It is to be understood that these blades are mounted in a circuit breaker in substantially the same manner as previously described and function in substantially the same manner as the blades illustrated in FIGS. 3 and 4. In the blade structures illustrated in FIGS. 5 to 9, the entire embossed flat surfaces are disposed outwardly of the nondevelopable spherical central portion and reinforcing ribs or flanges are provided to support the blade and provide a hinge line extending slightly inwardly of the periphery of the nondevelopable surface. While a weld plate is not illustrated as being welded to one embossed flat surface, such a plate may be employed if desired. In FIGS. 5 to 7 inclusive, embossed flat surfaces 55a and 57a terminate just outwardly of the spherical central portion 41a. Contact element 47a is welded to flat surface 57a and terminal 35a is welded to one face of flat surface 55a. Instead of narrow ears as employed on the blade of FIGS. 3 and 4, embossed ribs 101 are provided along the edges of the blade. These ribs are outside the spherical central portion 41a and have their inner ends terminating just slightly inwardly of the periphery of the spherical surface 41a. The ribs thus reinforce and stabilize the blade and still permit greatest deflection of the contact element carrying end of the blade as previously described.

The blade illustrated in FIGS. 8 and 9 is substantially identical to the blade illustrated in FIGS. 5 to 7, except that the reinforcing means is provided by bent over flanges 103 on the edges of the blade outwardly of the spherical surface 41b. The embossed flat surfaces 55b and 57b again terminate outside of spherical surface 41b.

What is claimed is:

1. A snap action thermostatic blade including a center portion deformed to provide a nondevelopable surface adapted to change shape abruptly upon reaching a predetermined internal stress resulting from being heated to a predetermined temperature, a pair of integral ears projecting outwardly from opposite ends of said blade, an elongated embossment providing a flat surface extending inwardly from the outer end of at least one of said ears and terminating slightly inwardly of the periphery of said nondevelopable surface, an elongated plate welded to said flat surface and being substantially coextensive in length with said embossed flat surface so that when said nondevelopable surface changes shape abruptly the ear opposite to said weld plate ear deflects about a hinge line extending across said blade in substantial alignment with the inner end of said embossed flat surface whereby to provide substantial deflection to said other ear when said nondevelopable surface abruptly changes its shape, and a contact element connected with said other ear.

2. An electric circuit breaker comprising a housing, a thermostatic blade disposed within said housing and including a center portion deformed to provide a nondevelopable surface adapted to change shape abruptly upon being heated to a predetermined temperature, a pair of ears projecting outwardly from opposite ends of said blade, means anchoring one of said ears within said housing, a contact element connected with the other of said ears, and a stationary contact supported in said housing into and out of engagement with which said blade contact element is adapted to move, said means including an elongated plate extending from the outer end of said one ear and terminating slightly inwardly of the periphery of said blade nondevelopable surface so that the inner end of said plate defines a hinge line about which said blade will deflect when said nondevelopable surface changes shape, thereby providing substantial deflection for the contact element ear of said blade as it moves into and out of engagement with said stationary contact.

3. A snap action thermostatic blade formed from sheet material and including a central portion deformed to provide a nondevelopable surface adapted to change shape abruptly upon reaching a predetermined internal stress resulting from being heated to a predetermined temperature, an elongated flat surface extending inwardly from each of the opposite ends of said blade and lying in a plane disposed out of the plane of the adjacent end of said blade, a contact element welded to one of said flat surfaces, the other of said flat surfaces being adapted to be anchored to a base, and reinforcing means on said other flat surface end of said blade extending inwardly from the outer end thereof and terminating short of the adjacent peripheral portion of said nondevelopable surface so as to reinforce said end of said blade against fatigue and failure and so as to aid in defining a hinge line extending across said blade slightly spaced from the adjacent peripheral portion of said nondevelopable surface about which said blade will deflect when it changes shape abruptly.

References Cited in the file of this patent

UNITED STATES PATENTS

| | | |
|---|---|---|
| 1,987,662 | Bletz | Jan. 15, 1935 |
| 1,987,725 | Veinott | Jan. 15, 1935 |
| 1,997,673 | Boothby | Apr. 16, 1935 |
| 2,041,775 | Mottlau | May 26, 1936 |
| 2,066,904 | Bartmess | Jan. 5, 1937 |
| 2,487,684 | Smith | Nov. 8, 1949 |
| 2,564,931 | Smith | Aug. 21, 1951 |
| 2,771,528 | Moran | Nov. 20, 1956 |
| 2,828,385 | Malone | Mar. 25, 1958 |
| 2,861,149 | Hollis et al. | Nov. 18, 1958 |